United States Patent
Coss, Jr. et al.

(10) Patent No.: US 7,788,065 B2
(45) Date of Patent: Aug. 31, 2010

(54) METHOD AND APPARATUS FOR CORRELATING TEST EQUIPMENT HEALTH AND TEST RESULTS

(75) Inventors: Elfido Coss, Jr., Austin, TX (US); Eric Omar Green, Austin, TX (US); Rajesh Vijayaraghavan, Austin, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 146 days.

(21) Appl. No.: 11/772,503

(22) Filed: Jul. 2, 2007

(65) Prior Publication Data

US 2009/0012737 A1    Jan. 8, 2009

(51) Int. Cl.
*G06F 11/30* (2006.01)

(52) U.S. Cl. ..................................... 702/183

(58) Field of Classification Search ................. 702/84, 702/183, 186, 85, 83; 324/158.1
See application file for complete search history.

(56) References Cited

U.S. PATENT DOCUMENTS

| | | | | |
|---|---|---|---|---|
| 5,589,765 A | * | 12/1996 | Ohmart et al. | 324/158.1 |
| 6,356,858 B1 | * | 3/2002 | Malka et al. | 702/186 |
| 6,804,619 B1 | * | 10/2004 | Chong et al. | 702/84 |
| 2009/0012730 A1 | * | 1/2009 | Coss et al. | 702/85 |

* cited by examiner

*Primary Examiner*—Tung S Lau
*Assistant Examiner*—Xiuquin Sun
(74) *Attorney, Agent, or Firm*—Williams, Morgan & Amerson, P.C.

(57) ABSTRACT

A method includes collecting trace data associated with a first device tester. A tester health metric is generated for the first device tester. At least one device tested by the first device tester is retested responsive to determining the tester health metric violates a predetermined threshold. A system includes a first device tester operable to test devices and a tester monitoring unit. The tester monitoring unit is operable to collect trace data associated with the first device tester, generate a tester health metric for the first device tester, and initiate a retest of at least one device tested by the first device tester responsive to determining the tester health metric violates a predetermined threshold.

24 Claims, 2 Drawing Sheets

METHOD AND APPARATUS FOR CORRELATING TEST EQUIPMENT HEALTH AND TEST RESULTS

CROSS-REFERENCE TO RELATED APPLICATIONS

Not applicable.

BACKGROUND OF THE INVENTION

The disclosed subject matter relates generally to manufacturing and, more particularly, to a method and apparatus for correlating test equipment health and test results.

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a wafer using a variety of processing tools, including photolithography steppers, etch tools, deposition tools, polishing tools, rapid thermal processing tools, implantation tools, etc. During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device.

After fabrication of the devices is complete, each wafer is subjected to preliminary functional tests. Wafers that pass these tests are then cut to singulate the individual die, which are then packed in substrates. Packed dies are then subjected to additional tests against the specification of customers' orders to determine performance characteristics such as maximum operating speed, power, caches, etc.

Exemplary tests include initial class tests (ICL) that is a preliminary test for power and speed. ICL testing is usually followed by burn-in (BI) and post burn-in (PBI) tests that test packaged die under specified temperature and/or voltage stress, and automatic test equipment (ATE) tests that test die functionality. Then, packaged dies with different characteristics go through system-level tests (SLT) in which they are tested against customer requirements on specific electrical characteristics. In SLT, packaged dies are tested in an actual motherboard by running system-level tests (e.g., variance test programs). After completion of the testing, the devices are fused, marked, and packed to fill customer orders. This back-end processing is commonly referred to as the test, mark, pack (TMP) process.

Based on the results of the performance tests each device is assigned a grade, which effectively determines its market value. In general, the higher a device is graded, the more valuable the device. However, some applications do not require high-end devices. Accordingly, maximizing the profitability of the fabrication facility does not necessarily equate to maximizing the output of high-grade devices.

During the testing process, many different ATE testers are employed to test devices in parallel. Various test programs are implemented to determine functionality and grade information. The particular test programs may vary by device or customer requirements. To provide consistent test results across the multiple ATE testers, various calibration procedures or preventative maintenance procedures are periodically performed. Even with such measures, it is possible that a tester may drift from its calibrated state or may operate inconsistently. As a result, devices tested with the degraded tester may not be graded or verified properly. In the case where the devices are graded lower than what is actually warranted, a direct loss in profit results.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY OF THE INVENTION

The following presents a simplified summary of the disclosed subject matter in order to provide a basic understanding of some aspects thereof. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method that includes collecting trace data associated with a first device tester. A tester health metric is generated for the first device tester. At least one device tested by the first device tester is retested responsive to determining the tester health metric violates a predetermined threshold.

Another aspect of the disclosed subject matter is seen in a system including a first device tester and a tester monitoring unit. The first device tester is operable to test devices. The tester monitoring unit is operable to collect trace data associated with the first device tester, generate a tester health metric for the first device tester, and initiate a retest of at least one device tested by the first device tester responsive to determining the tester health metric violates a predetermined threshold.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
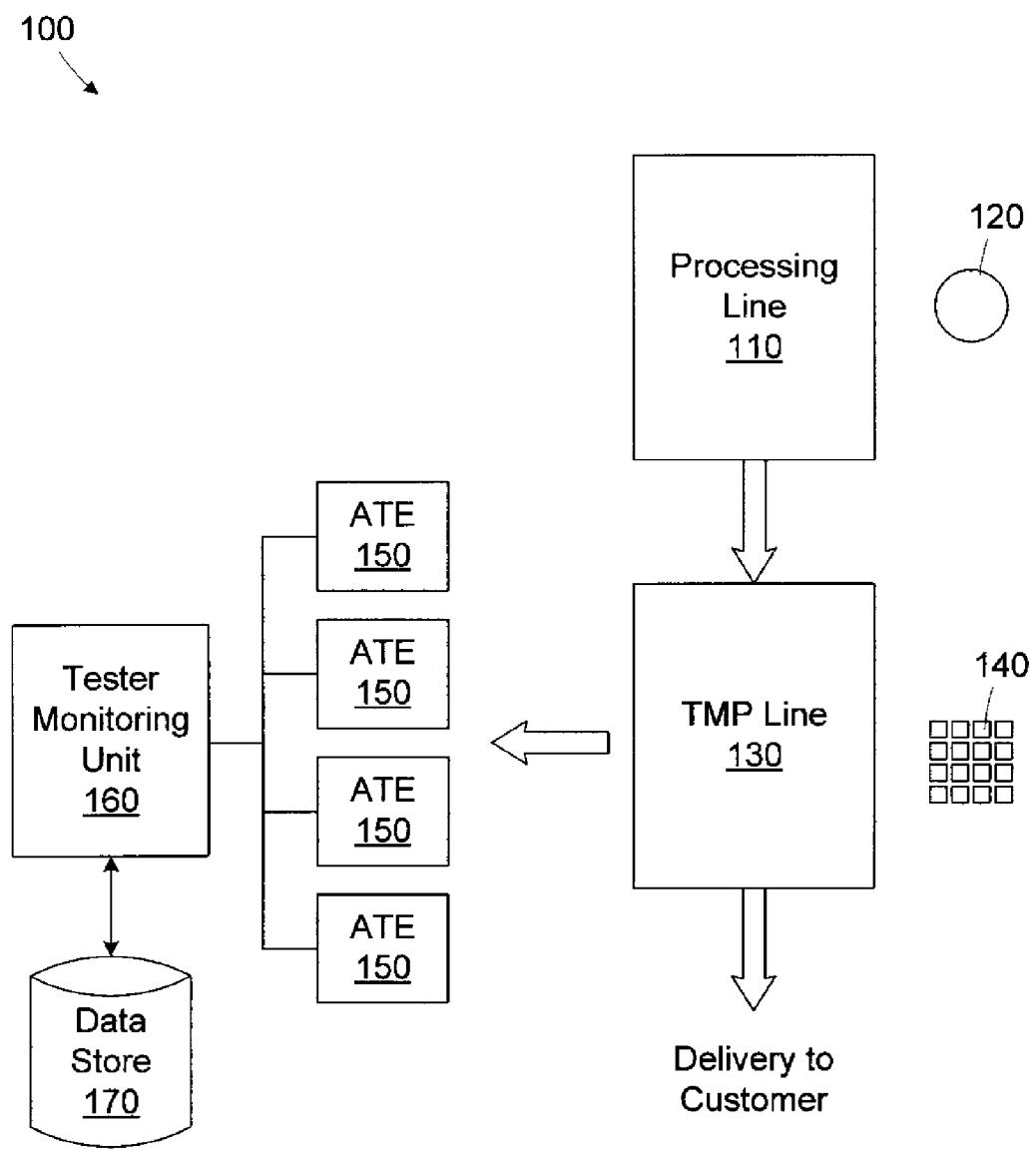
FIG. 1 is a simplified block diagram of a manufacturing system in accordance with one embodiment of the disclosed subject matter.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION OF THE INVENTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "accessing" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices. Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Referring now to the drawings wherein like reference numbers correspond to similar components throughout the several views and, specifically, referring to FIG. 1, the disclosed subject matter shall be described in the context of an illustrative manufacturing system 100. The manufacturing system 100 includes a processing line 110 for fabricating wafers 120, a test, mark, pack (TMP) line 130 for processing devices 140, automated test equipment (ATE) testers 150, a tester monitoring unit 160, and a data store 170.

In the illustrated embodiment, wafers 120 are processed by the processing line 110 to fabricate die thereon. The processing line 110 may include a variety of process tools and/or metrology tools, which may be used to process and/or examine the wafers to fabricate the semiconductor devices. For example, the process tools may include photolithography steppers, etch tools, deposition tools, polishing tools, rapid thermal anneal tools, ion implantation tools, and the like. The process metrology tools may include thickness measurement tools, scatterometers, ellipsometers, scanning electron microscopes, and the like. Techniques for processing the wafers 120 are well known to persons of ordinary skill in the art and therefore will not be discussed in detail herein for clarity and to avoid obscuring the disclosed subject matter. Although a single wafer 120 is pictured in FIG. 1, it is to be understood that the wafer 120 is representative of a single wafer as well as a group of wafers, e.g. all or a portion of a wafer lot that may be processed in the processing line 110.

After the wafers 120 have been processed in the processing line 110 to fabricate the die, certain metrology tools, such as sort or final wafer electrical test (FWET) tools may be employed to collect electrical performance data while the wafer is still uncut. Sort metrology employs a series of probes to electrically contact pads on the completed die to perform electrical and functional tests. For example, a sort metrology tool may measure voltages and/or currents between various nodes and circuits that are formed on the wafer 120. Exemplary sort parameters measured include, but are not limited to, clock search parameters, diode characteristics, scan logic voltage, static IDD, VDD min, power supply open short characteristics, and ring oscillator frequency, etc. The particular sort parameters selected may vary depending on the application and the nature of the device formed on the die. Final wafer electrical testing (FWET) entails parametric testing of discrete structures like transistors, capacitors, resistors, interconnects and relatively small and simple circuits, such as ring oscillators. It is intended to provide a quick indication as to whether or not the wafer is within basic manufacturing specification limits. Wafers that exceed these limits are typically discarded so as to not waste subsequent time or resources on them.

After the die on the wafer 120 have completed preliminary testing, the wafers 120 are cut to singulate the die. Each die is then each mounted to a package, resulting in the devices 140. ATE testers 150 in the TMP line 130 then subject the devices 140 to various testing programs to grade the devices and verify full functionality. The tester monitoring unit 160 monitors the testers 150 to determine tester health and correlate the tester health with tester result data to facilitate further testing plans for the devices, as will be described in greater detail below. By correlating the tester health with the results data, retests may be performed if it is suspected that a degraded tester Data collected from the testers 150 may be stored in the data store 170.

Generally, the tester monitoring unit 160 monitors trace date for the testers 150 over various test runs. The trace data may include a variety of parameters, including but not limited to, data associated with the tester, data regarding the device under test (DUT), test program data, or the result data generated by the test run. Various comparison techniques may be used to gauge the "health" of one tester 150 in comparison to other similar testers 150.

In a first embodiment, the tester monitoring unit 160 employs a multivariate tester health model to determine a health metric for each of the testers 150. By comparing the health metrics, the tester monitoring unit 160 may identify a tester experiencing a degraded condition relative to the other testers 150. This degraded condition may not rise to the level of a fault condition with the tester 150, but rather may indicate that the tester 150 performance is starting to drift. An exemplary tester health monitor software application is Model-Ware™ offered by Triant, Inc. of Nanaimo, British Columbia, Canada Vancouver, Canada. The tester trace data may include data associated with the tester itself and/or result data gathered by the tester, as illustrated below.

Exemplary tester trace data that may be incorporated into the tester health model include, by way of illustration and not limitation, the parameters listed below.

Cell Level
  Refrigerant level
  Rack Level
    Tray Level
      Voltage sensors
      Ambient temperature sensors
      Fan sensors
      DUT Level
        Thermal sensors
        Socket voltages (device)
        Current sensor (pug)
        Ambient temp sensors
        DUT board sensors (socket board/non-device)
        Voltage sensors on chipset board One type of multivariate model that may be used to generate tester health metrics is a recursive principal component analysis (RPCA) model. Tester health metrics are calculated by comparing data for a particular tester 150 to a model built from a known-good tester (i.e., also referred to as a golden state model). For an RPCA technique, the tester health metric may be the ($\phi_r$ statistic, which is calculated for every node in a hierarchy of trace data parameters, and is a positive number that quantitatively measures how far the value of that node is within or outside 2.8-$\sigma$ of the expected distribution. Although the application of the disclosed subject matter is described as it may be implemented using a RPCA model, the scope is not so limited. Other types of multivariate statistics-based analysis techniques that consider a plurality of parameters and generate a single quantitative metric indicating the health of the tester may be used. For example, one alternative modeling technique includes a k-Nearest Neighbor (KNN) technique. The node hierarchy may be used to classify the tester health results. For example, blocks may be associated with tester temperature control or frequency measurement. Based on the particular components that give rise to the degraded health condition, the condition may be classified.

In another embodiment, the tester monitoring unit 160 may employ tester result data for a particular device tested in the testers 150 to generate tester health metrics. For example, a test program may be executed by each tester 150 on a particular DUT. If the testers 150 were operating consistently, the results of these tests should also be consistent. The particular test routine used may vary depending on the particular implementation. For example, to lessen delays caused by running multiple tests on the same device, a reduced test program may be used. One or more performance parameters, such as maximum clock speed, leakage current, power consumption, may be compared for the DUT across the plurality of testers 150.

Certain device parameters are typically stable across different testing cycles. For example, parameters such as diode ideality, thermsense macro measurement, ring oscillator frequency, etc. are typically measured during preliminary SORT tests and remain stable after the devices are singulated and packaged. Based on these stable parameters, the tester health model may compare measurements collected by a current tester for a device to parameter values from previous insertions. For example, if the measurements of the device parameters by the current tester are consistent with the previous data, the tester health may be considered relatively high. If the current measurements are not consistent with the SORT data, or data from other previous insertions, a performance problem with the tester may be present. A residual or distance technique may be used to generate tester health metrics based on the tester result data. Such comparative data may also be tracked over time using SPC techniques to identify systematic measurement biases between testers. If one or more of the tester biases diverges over time, corrective actions may be taken.

In some embodiments, the tester result data may be combined with the tester sensor data described above and applied to a common multivariate model. Hence, the tester trace data may include both tester status data and tester result data.

In yet another embodiment, the tester monitoring unit 160 may directly compare the trace data sets for the plurality of testers 150 to one another rather than use a health model. For example, a residual analysis may be used to identify a "distance" between a particular trace data set an average value of the trace data parameters for the collective set of trace data sets. In other words, the reference to which each set of trace data is compared is generated dynamically based on the collective sets of trace data rather than using a fixed reference. In this technique, the residual or distance value may represent the tester health metric.

The techniques for generating tester health metrics may also be combined. For example, the distance between a selected trace data set and a reference trace data set generated by aggregating the plurality of trace date sets may be computed as a screening technique. For testers 150 that violate a screening threshold, a more computationally intensive RPCA tester health model may be used to refine the tester health metric to allow more accurate classification of the problem condition. Alternatively, the testers 150 that fail the screening test may be subjected to the common DUT test along with a sample of testers that passed the screening test. In this manner, the common DUT test need not be performed on every tester 150, thereby reducing throughput impacts.

The tester monitoring unit 160 links the health metric for a particular tester 150 with the tester results data collected for a particular device. The intervals at which tester health metrics are determined and tester results data is collected may not coincide. For example, the tester health metrics may be determined on a sampling basis (i.e., not after each test run). In such a case, a particular tester health metric may be associated with a plurality of tester results data sets.

The tester health metrics provide an indication of the confidence that maybe attributed to the tester results data. For example, if the tester health metric is in an acceptable range, the results data presumably accurately reflects the capabilities of the DUT. However, if the tester health metric indicates a degraded tester health (e.g., in absolute terms or relative to other testers 150), the test results may less accurately represent the capabilities of the DUT. As a result, the tester 150 issue that contributed to the lower tester health metric may cause the DUT to be graded in a lower bin than what is actually achievable by the DUT. Such a lower grade, if not addressed could give rise to revenue loss.

By correlating the tester health with the test results, the tester monitoring unit 160 identifies devices that should be retested prior to being binned. For example, if the tester health metric is below a predetermined threshold, devices tested during the time period associated with the degraded health metric may be retested. The retest may be a full retest or a reduced scope verification test aimed at determining if the first tester results were sufficiently accurate.

In some cases, the trace data itself may provide a clue to the nature of the problem with a particular tester 150. For example, in a PCA technique a hierarchy of parameters may be defined. The tester monitoring unit 160 may output an overall health metric as well as any nodes in the hierarchy that deviated appreciably from the golden model. For instance, if an ambient temperature sensor associated with the DUT provides a suspect reading, the tester monitoring unit 160 may indicate as such. In the case of other distance or residual models, the overall health metric may be a composite value of all the distances. However, certain components may have a greater contribution to the overall distance reflected in the health metric.

The tester monitoring unit 160 may classify the problem condition and determine if the tester results data correspond to the problem condition. For example, if a temperature subsystem on the tester contributed to the lower tester health metric, devices that failed a temperature related test may be retested. Similarly, if a frequency related node on the hierarchy contributes to the degraded health metric, devices may be retested to determine if they may be placed in a higher frequency bin. However, devices that failed a temperature based test may not be retested if the temperature node did not contribute to the degraded health metric.

The use of tester health metrics as described above has numerous advantages. Devices that are tested by testers 150 that are compromised, as evidenced by relatively lower health metrics, may be retested to provide for a more accurate representation of the devices. In this manner, the market value of the devices may be more accurately determined, and the profitability of the manufacturing system 100 may be increased.

Figure 2:
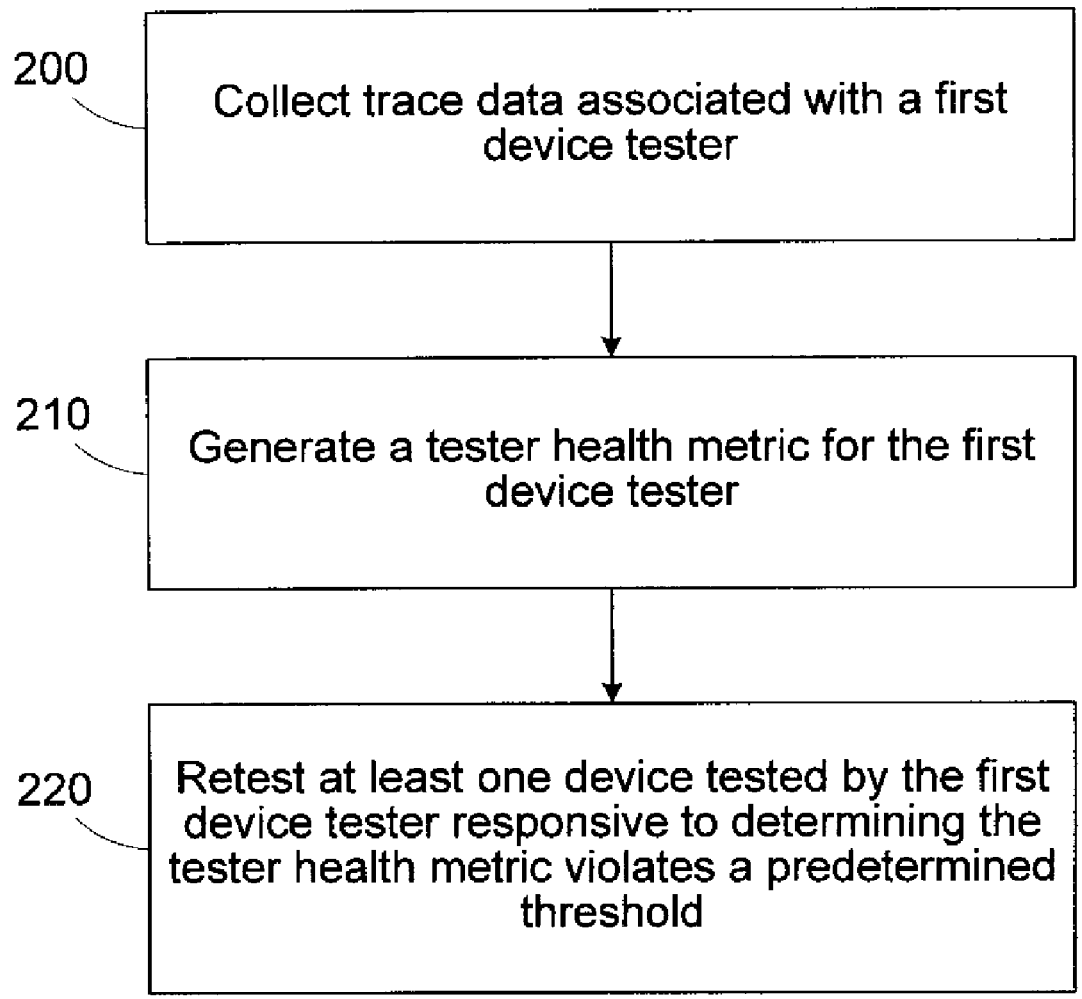
FIG. 2 is a simplified flow diagram of a method for determining device test requirements by correlating test equipment health and test results in accordance with another illustrative embodiment of the disclosed subject matter.

Turning now to FIG. 2, a simplified flow diagram of a method for correlating test equipment health and test results in accordance with another illustrative embodiment of the disclosed subject matter is provided. In method block 200, trace data associated with a first device tester is collected. In method block 210, a tester health metric for the first device tester is generated. In method block 220, at least one device tested by the first device tester is retested responsive to determining the tester health metric violates a predetermined threshold.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method, comprising:
generating a reference trace data set from trace data collected from a plurality of device testers operable to test a plurality of integrated circuit devices, wherein the trace data from the plurality of device testers includes trace data associated with testing performed on different ones of the plurality of integrated circuit devices;
collecting trace data associated with a first device tester operable to test integrated circuit devices, wherein the plurality of device testers includes at least one device tester other than the first tester;
generating a tester health metric for the first device tester by comparing the trace data for the first device tester to the reference trace data set; and
retesting at least one integrated circuit device tested by the first device tester responsive to determining the tester health metric violates a predetermined threshold.

2. The method of claim 1, wherein generating the tester health metric comprises generating the tester health metric using a multivariate statistical model and the trace data.

3. The method of claim 1, further comprising:
classifying a problem condition with the first tester based on the tester health metric; and
selecting the at least one integrated circuit device from a plurality of integrated circuit devices tested by the first device tester based on the classified problem condition.

4. The method of claim 3, wherein the classified problem condition comprises a temperature problem condition, and selecting the at least one integrated circuit device further comprises selecting at least one integrated circuit device associated with a failed temperature test.

5. The method of claim 3, wherein the classified problem condition comprises a frequency problem condition, and retesting the at least one integrated circuit device further comprises retesting a frequency rating of the at least one integrated circuit device in a different tester.

6. The method of claim 1, wherein collecting the trace data and determining the tester health metric occurs after testing an integrated circuit device in the first device tester.

7. The method of claim 1, wherein collecting the trace data and determining the tester health metric occurs periodically, and the method further comprises retesting a plurality of integrated circuit devices tested by the first device tester since the last periodic determination of the tester health metric responsive to determining the tester health metric violates a predetermined threshold.

8. The method of claim 1, wherein the trace data comprises tester result data.

9. The method of claim 1, wherein the trace data comprises tester status data.

10. The method of claim 1, wherein retesting the at least one integrated circuit device, further comprises retesting the at least one integrated circuit device in a second device tester other than the first device tester.

11. A system, comprising:
  a first device tester operable to test integrated circuit devices;
  a tester monitoring unit operable to collect trace data associated with the first device tester, generate a reference trace data set from trace data collected from a plurality of device testers operable to test a plurality of integrated circuit devices, wherein the plurality of device testers includes at least one tester other than the first tester and the trace data from the plurality of device testers includes trace data associated with testing performed on different ones of the plurality of integrated circuit devices, generate a tester health metric for the first device tester by comparing the trace data for the first device tester to the reference trace data set, and initiate a retest of at least one integrated circuit device tested by the first device tester responsive to determining the tester health metric violates a predetermined threshold.

12. The system of claim 11, wherein the tester monitoring unit is operable to generate the tester health metric using a multivariate statistical model and the trace data.

13. The system of claim 11, wherein the tester monitoring unit is operable to classify a problem condition with the first tester based on the tester health metric and select the at least one integrated circuit device from a plurality of integrated circuit devices tested by the first device tester based on the classified problem condition.

14. The system of claim 13, wherein the classified problem condition comprises a temperature problem condition, and the tester monitoring unit is operable to select at least one integrated circuit device associated with a failed temperature test.

15. The system of claim 13, further comprising a second device tester, wherein the classified problem condition comprises a frequency problem condition, and the tester monitoring unit is operable to initiate retesting of a frequency rating of the at least one integrated circuit device in the second device tester.

16. The system of claim 11, wherein the trace data comprises tester result data.

17. The system of claim 11, wherein the trace data comprises tester status data.

18. The system of claim 11, further comprising a second device tester other than the first device tester, wherein the tester monitoring unit is operable to initiate retesting of the at least one integrated circuit device in the second device tester.

19. A system, comprising:
  means for generating a reference trace data set from trace data collected from a plurality of device testers operable to test a plurality of integrated circuit devices wherein the trace data from the plurality of device testers includes trace data associated with testing performed on different ones of the plurality of integrated circuit devices;
  means for collecting trace data associated with a first device tester operable to test integrated circuit devices, wherein the plurality of device testers includes at least one tester other than the first tester;
  means for generating a tester health metric for the first device tester by comparing the trace data for the first device tester to the reference trace data set; and
  means for retesting at least one integrated circuit device tested by the first device tester responsive to determining the tester health metric violates a predetermined threshold.

20. A method, comprising:
  collecting trace data associated with a first device tester operable to test integrated circuit devices;
  generating a tester health metric for the first device tester;
  classifying a problem condition with the first tester based on the tester health metric wherein, the classified problem condition comprises a frequency problem condition;
  selecting at least one integrated circuit device from a plurality of integrated circuit devices tested by the first device tester based on the classified problem condition;
  retesting the selected integrated circuit device tested by the first device tester responsive to determining the tester health metric violates a predetermined threshold by retesting a frequency rating of the at least one integrated circuit device in a different device tester.

21. The method of claim 20, wherein generating the tester health metric comprises generating the tester health metric using a multivariate statistical model and the trace data.

22. The method of claim 20, wherein collecting the trace data and determining the tester health metric occurs after testing an integrated circuit device in the first device tester.

23. The method of claim 20, wherein collecting the trace data and determining the tester health metric occurs periodically, and the method further comprises retesting a plurality of integrated circuit devices tested by the first device tester since the last periodic determination of the tester health metric responsive to determining the tester health metric violates a predetermined threshold.

24. The method of claim 20, wherein the trace data comprises tester result data.

* * * * *